(12) United States Patent
Rowen et al.

(10) Patent No.: US 7,980,770 B2
(45) Date of Patent: Jul. 19, 2011

(54) CAMERA MANIPULATION DEVICE

(75) Inventors: Jonathan Rowen, West Hills, CA (US); James E. ("Jes") Smith, San Jose, CA (US)

(73) Assignee: Camtrol L.L.C., Oxnard, CA (US)

( * ) Notice: Subject to any disclaimer, the term of this patent is extended or adjusted under 35 U.S.C. 154(b) by 0 days.

(21) Appl. No.: 12/565,364

(22) Filed: Sep. 23, 2009

(65) Prior Publication Data

US 2010/0104274 A1 Apr. 29, 2010

(51) Int. Cl.
*G03B 17/00* (2006.01)
(52) U.S. Cl. ...... 396/420; 348/376; 248/688; 248/181.1
(58) Field of Classification Search .................. 396/420, 396/425; 248/177.1, 187.1, 688, 181.1; 348/376
See application file for complete search history.

(56) References Cited

U.S. PATENT DOCUMENTS

| | | | | |
|---|---|---|---|---|
| 4,545,660 A * | 10/1985 | Rudolf | ........................... | 396/425 |
| 4,963,904 A * | 10/1990 | Lee | ................. | 396/423 |
| 5,081,478 A | 1/1992 | Hayashida et al. | | |
| 5,477,287 A * | 12/1995 | Campbell | ....................... | 396/28 |
| 5,664,750 A * | 9/1997 | Cohen | ...................... | 248/231.71 |
| 6,729,592 B1* | 5/2004 | Kurtts | ......................... | 248/278.1 |
| 2003/0052993 A1* | 3/2003 | Zadok | .......................... | 348/373 |
| 2003/0201371 A1* | 10/2003 | Zadok | ........................ | 248/276.1 |
| 2005/0061933 A1* | 3/2005 | Barth | ........................ | 248/178.1 |
| 2005/0258660 A1* | 11/2005 | Wu | ................................ | 294/139 |
| 2007/0053680 A1* | 3/2007 | Fromm | ........................ | 396/420 |
| 2007/0292125 A1* | 12/2007 | Saxton | ........................ | 396/420 |

* cited by examiner

*Primary Examiner* — Rodney E Fuller
*Assistant Examiner* — Fang-Chi Chang
(74) *Attorney, Agent, or Firm* — Florek & Endres PLLC

(57) ABSTRACT

A camera manipulation device comprising a plate having a top surface, a mounting element for securing a camera to the top surface of the plate, a handle for a user to hold the camera manipulation device and two or more connector elements for connecting the handle to the mounting plate, wherein each of said connector elements comprises at least one of a first and second pivot element.

20 Claims, 7 Drawing Sheets

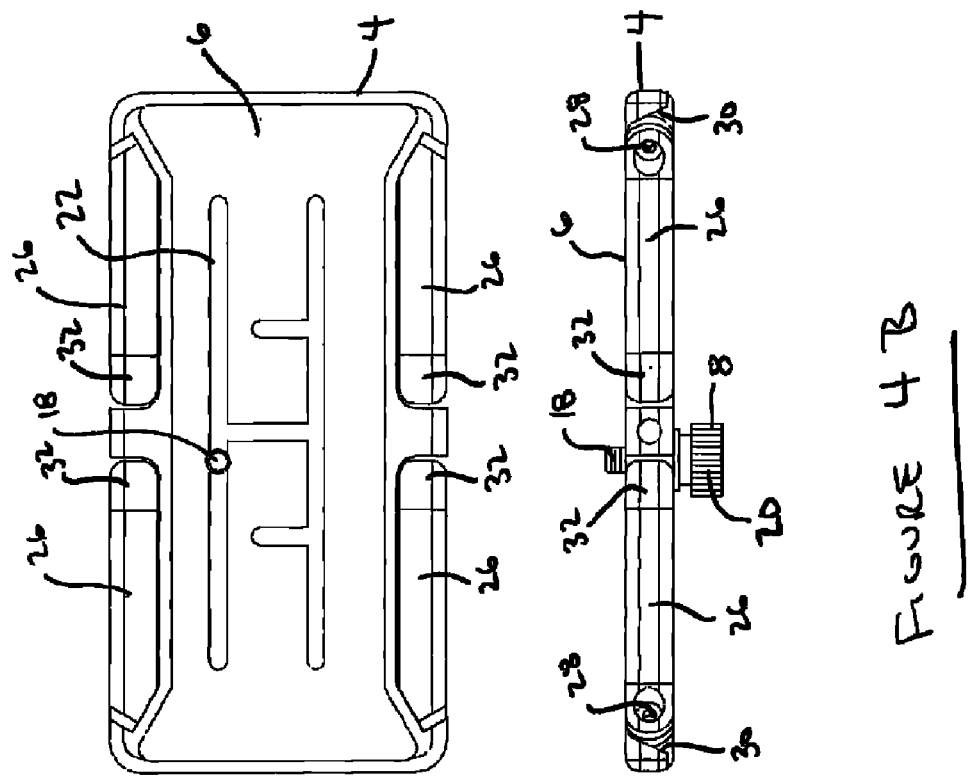

CAMERA MANIPULATION DEVICE

FIELD OF THE INVENTION

The present invention relates to the field of camera stands, grips and devices used to hold and position still, video and other types of cameras. More particularly, the present invention is directed to a camera stand and manipulation device used to hold and position still, video and other types of cameras.

BACKGROUND OF THE INVENTION

Cameras have long been provided with grips in the form of tactile configurations for securely holding the camera during transport and use. Such grips routinely comprise raised bumps or indentations on the camera body that assist in the camera being grasped by a user. However, such tactile configurations merely provide a user with a particular and consistent way to hold the camera.

More recently, camera grips have further incorporated straps that pass about the back of a users hand, across the area where the user holds the camera, that help hold the camera with less gripping effort. Since the strap merely encompasses the back of the user's hand as it holds the camera, by the tactile configuration adapted for gripping the camera, it does not offer any options in the way the camera is held.

Additionally, known camera grips have also been designed to attach to a camera, often using the universal threaded opening found on the bottom of most cameras. These attachable grips are generally J-shaped, providing a grip that is fixed adjacent to the side of the camera, or T-shaped, where the camera rests atop the grip.

All of the known grips, however, are limited in the configurations allowing the user to position the camera relative to the grip. For example, the J-shaped grips known are generally just a vertical grip member that extends from a horizontal member which is attached to the bottom of the camera. Thus, the J-shaped grips do not provide any way to adjust the position of the camera relative to the grip. Similarly, U.S. Pat. No. 5,081,478 describes a T-shaped grip that has a mounting block on which the camera rests with the grip extending downwardly therefrom. Although the grip can be folded, the user must engage the grip from below the camera without varying the position of the camera relative to the grip other than in a single dimension.

Therefore, there is a deficiency in the camera grip art which is addressed by the present invention.

SUMMARY OF THE INVENTION

The present invention is directed to a camera manipulation device comprising a plate having a top surface, a mounting element for securing a camera to the top surface of the plate, a handle for a user to hold the camera manipulation device and two or more connector elements for connecting the handle to the mounting plate, wherein each of said connector elements comprises at least one of a first and second pivot. As used in this application, a camera can refer to still or moving image cameras, including but not limited to still, film, tape, digital and video cameras and camcorders.

Preferably, the camera manipulation device includes a plurality of feet, and most preferably a plurality of legs terminating in feet, extending from the plate on which the device can rest when placed on a surface. In its most preferred embodiment, the legs are retractable, through the use of pivots between the plate and the legs, to position the legs out of the way when the device is being held by the user during use. It is preferred that the feet be formed of a rubber or like elastomeric material for cushioning and to avoid sliding when placed on a hard surface.

In this regard, it is anticipated that the present device be used for more than merely manipulating the camera during use, but also for setting the camera in a fixed position during use, storing the camera during non-use or holding the camera during editing. Thus, with the legs extended or the feet otherwise engaging a surface on which the device can be placed, the device includes a platform for the camera.

The plate preferably includes one or more slots for variable positioning of the mounting element in relation to the plate. This permits a camera to be secured to the plate at a variety of positions depending on the preference of the user, including centered on the plate or at a user determined location forward, back, left or right of center. To permit such mounting, it is preferred that the mounting element be a mounting bolt as is well known, having a threaded end that can be passed through an opening or slot on the plate and screwed into the universal mounting screw hole found on most all cameras, and a user manipulated head accessible on the bottom of the plate.

The two or more connector elements permit the adaptation of the device to fix the handle or grip in any of a number of positions relative to the camera, including above, below, to the sides or behind the camera. Moreover, the preferred embodiment may include pivot elements on the plate and/or the handle to provide improved positioning of the handle relative to the camera.

The pivots can be of any type that permits the handle to be positioned relative to the camera in two or more dimensions, however, ball joints are most preferred to provide three dimensional positioning. Additionally, it is most preferred that the pivots have a lock or locking mechanism for fixing the relative position of the elements, such as a clamp associated with the socket in a ball joint to prohibit movement of the ball in the socket when tightened.

The handle preferably includes not only a grip portion for a user to hold, but also a strap for secure engagement of the device by the user. The strap can be affixed to the handle in one location, for a wrist strap to ensure that the device/camera is not dropped, or in two locations, i.e., the top and bottom of the grip area, to engage the back of the user's hand when holding the grip.

The preferred handle also includes control activators, such as a shutter release or start/stop button, zoom in/out, etc. Although the control activators can be fixed on the handle or elsewhere on the device, it is preferred that they be formed on a control activator module associated with the handle. Moreover, it is preferred that the control activator module be movably attached to the handle or an extension thereof, so that the user can set a comfortable position of the control activator module relative to the handle grip. When such control activators or control activator module is used, a control line operatively associated with the control activators having a jack for attaching to the camera is envisioned.

In its preferred embodiment, a user can attach a camera to the plate and position the handle relative to the camera by loosening the locks associated with the pivots, moving the relative positions of any of the plate, two or more connector elements and handle by pivoting the pivot elements, and locking the positions of the plate, two or more connector elements and handle.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

FIG. 4A is a top view of the plate of the camera manipulation device of the present invention with the legs retracted.

FIG. 4B is a side view of the plate of the camera manipulation device of the present invention with the legs retracted.

FIG. 4C is a rear view of the plate of the camera manipulation device of the present invention with the legs retracted.

DETAILED DESCRIPTION OF THE PREFERRED EMBODIMENT

Figure 1:
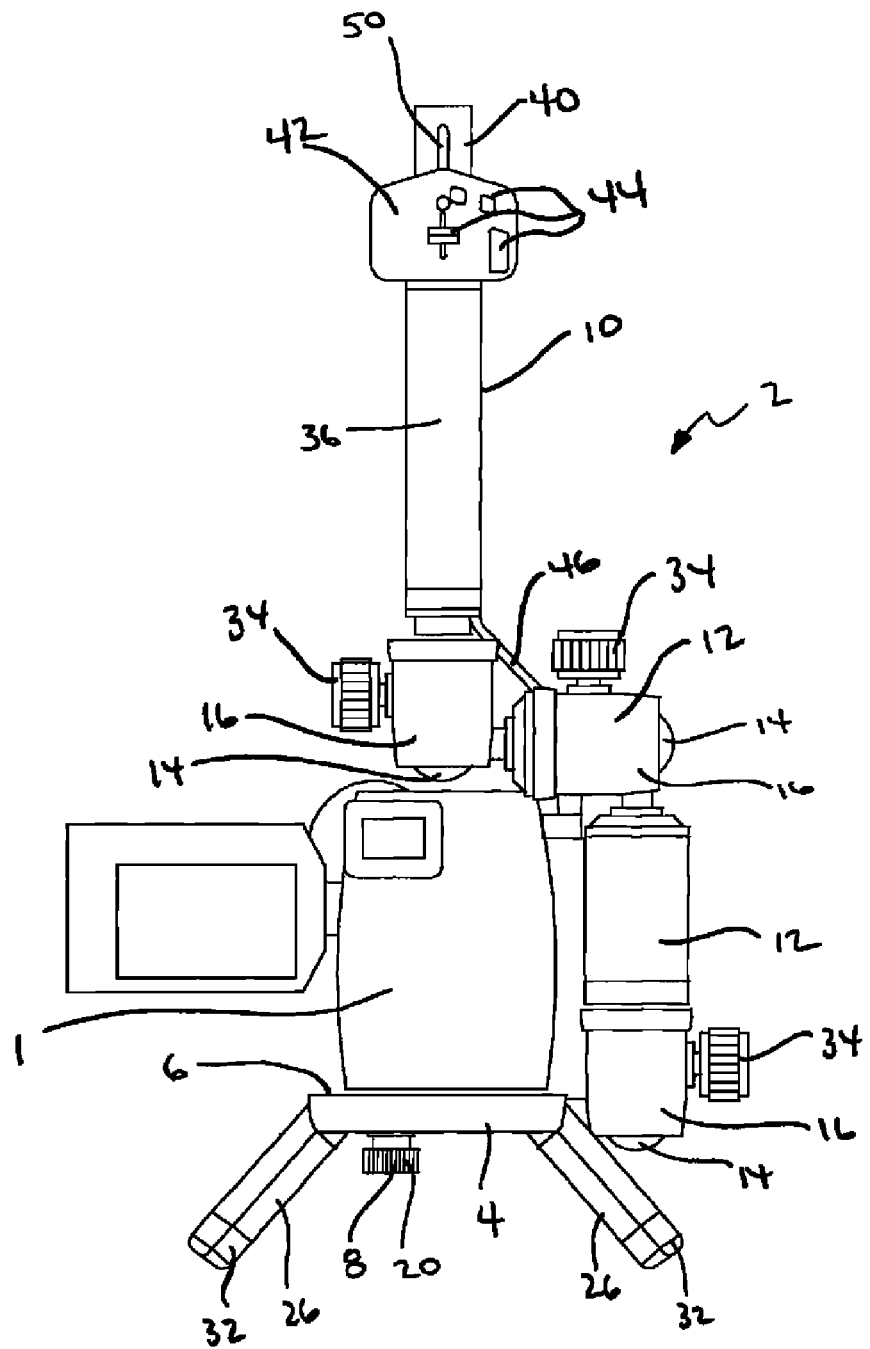
FIG. 1 is a rear elevation of the camera manipulation device of the present invention with a camera mounted thereon, looking from the user's perspective.

As best shown in FIGS. 1, 2A, 2B and 2C, the preferred camera manipulation device 2 of the present invention includes a plate 4 having a top surface 6 and a mounting element 8 for securing a camera 1 to the top surface 6 of the plate 4. A handle 10 is provided for a user to hold the camera manipulation device 2, with the handle 10 attached to the plate 4 by means of two connector elements 12. Each of the connector elements 12 comprise at least one of a first pivot member 14 and second pivot member 16 so that the device 2 can be manipulated by the user into a variety of user determinable configurations.

The plate 4 of the preferred embodiment, further shown in FIGS. 4A, 4B and 4C, is preferably formed with a flat top surface 6 on which the camera 1 rests. The top surface 6 is preferably coated with or formed of a non-slip material, most preferably a soft 40 durrometer Neoprene elastomer to prevent the camera 1 from sliding once attached to the plate 4. The plate 4 may have any dimensions that permit a camera 1 to be retained on the plate 4, however, it is preferred that the plate 4 be formed of a width and length that extends beyond a standard camera 1. In this regard, a plate 4 having dimensions of about 3.5 inches wide by about 7.0 inches long and about 0.5 inches thick has been found to be well suited.

A mounting element 8 is provided to hold the camera 1 on the top surface 6 of the plate 4. Any mounting element that holds the camera 1 can be used, including well known mounting bolts used extensively with various camera accessories for mounting cameras to peripheral devices such as tripods, grips, etc. Such mounting bolts generally include a ¼-20 threaded end 18 and a knob 20, where the threaded end 18 engages a standard ¼-20 threaded opening universally found on the bottom of most cameras (not shown) and the knob 20 can be manipulated by the user by hand without the need for tools.

The preferred plate 4 includes a series of channels or slots 22 along which the mounting element 8 can be moved to properly align a camera 1 mounted on the top surface 6 of the plate 4 to achieve proper balance and center of gravity with respect to the handle. Preferably, the mounting element 8 has a narrowed section between the threaded end 18 and the knob 20, with a diameter that is slightly less than the width of the slots 22, as is well known in the art, so that the mounting element 8 is retained with the plate and does not separate from the plate 4 when the camera 1 is removed. A widened opening 24 can be incorporated into the slot 22 to provide for installation of the mounting element 8. When used, the elastomer material on the top surface 6 preferably does not include the widened opening 24, to aid in retaining the mounting element 8 on the plate 4.

Retractable legs 26 are provided on the plate 4 of the preferred embodiment shown in the attached drawings. The legs 26 can be fixed, however, it is preferred that they be capable of manipulation from an extended configuration, as in FIGS. 1, 2A, 2C and 3, to a retracted configuration, as shown in FIGS. 2B and 4A, 4B and 4C. Although any suitable method for providing fixed or retractable legs 26 may be employed, the preferred embodiment has retractable legs that use pivotable joints 28 to rotate the legs 26 downwardly to a fixed position against stops 30 on the plate 4. Such joints 28 may be in the form of pins, hinges, or the like, and can be assisted with springs, bands, etc., that ensure the legs 26 are retained in a fully opened or fully closed configuration, as desired. Alternatively, or in addition, clips, clasps, snaps, detents, magnets, or the like can be used to hold the legs 26 in the extended or retracted configuration, as desired. The preferred embodiment utilizes spring plungers and channels in the legs 26 to provide the desired locking locations and feel as the legs 26 transitions from the fully open to the fully closed configuration.

The camera manipulation device 2 described and illustrated rests on feet 32, either attached directly to the plate 4 or at the ends of the legs 26. Although the feet 32 can be formed of any suitable material and in any useful shape, it has been found that feet 32 formed in a rounded configuration of 60 D shore A Polyurethane or other elastomeric material capable of resisting slipping on a smooth surface and absorbing some shock is most preferred.

The first of the connector elements 12 of the preferred embodiment is pivotally attached to the plate 4. It is preferred that each of the pivot assemblies forming the pivotal attachments of the present invention be able to support a weight of at least 10 in-lbs to ensure the camera is held secure during use. Any suitable pivot assembly can be used, however, it is preferred that ball joints, having a ball element 14 that moves within a socket element 16, be used between the plate 4, connector elements 12 and handle 10. In keeping with this arrangement, the preferred pivot assembly permits pivoting in at least two dimensions.

Additionally, it is preferred that the pivot assemblies of the present invention have locking means to fix the associated components in a desired position. Although any known locking means can be used, the preferred embodiment illustrates a manually activated clamp capable of holding at least 10 in-lbs. As shown, this includes a socket element 16 that is compressible using a screw-down member 34, where sufficiently tightening the screw-down member 34 prohibits rotation of the ball element 14 within the socket element 16 and loosening the screw-down member 34 permits such rotation.

Improved versatility is found by including one of the first pivot member 14 or second pivot member 16 on the plate 4 and/or on the handle 10. In the embodiment shown and described here, the plate 4 includes a ball element 14 extending from the side of the plate 4, received by the socket pivot member 16 at one terminal end of the a connector element 12. Similarly, the handle 10 includes a socket pivot member 16 at one end for receiving a ball pivot member 14 on one end of a connector element 12.

The connector elements 12 preferably have one of the first pivot member 14 at one end and the second pivot member 16 at the other end, although connector elements 12 could have both ends with only one of the first 14 or second 16 pivot members as long as the adjacent plate 4, connector element 12 and/or handle 10 have the cooperating pivot member.

In its most preferred embodiment, the connector elements 12 are made of 6061-T6 Aluminum with a 60D shore A polyurethane cover for protection and ergonomic considerations, allowing the user to grip as a second handle if so desired. Moreover, it is anticipated that the device 2 come in different sizes, with the preferred connector elements 12 being available in, for example, about 5.3 inches for larger cameras and about 2.2 inches for smaller cameras.

As described above, one of the two or more connector elements 12 connects to a portion of the handle 10, and preferably the bottom end of the handle 10, shown here as having a socket pivot member 16 attached to or forming a portion of the handle 10. Additionally, the handle 10 includes a grip portion 36 which is directly engaged by the user's hand during use of the device 2.

Preferably, the grip portion 36 of the handle 10 has tactile features such as a gnarled surface, ergonomic indentations for the user's fingers and/or is formed of, coated with or covered by a material such as a foamed or hard rubber that makes the handle 10 easier to hold. The handle 10 may include a strap 38 associated therewith. The strap 38 may be formed as a loop with a single attachment point to place around the user's wrist to ensure that the device 2 and camera 1 are not accidentally dropped. Alternatively the strap, not shown, can attach at both the top and bottom of the grip portion 36 of the handle 10 to pass over the back of the user's hand when holding the grip portion 36 of the handle 10.

Figure 5B:
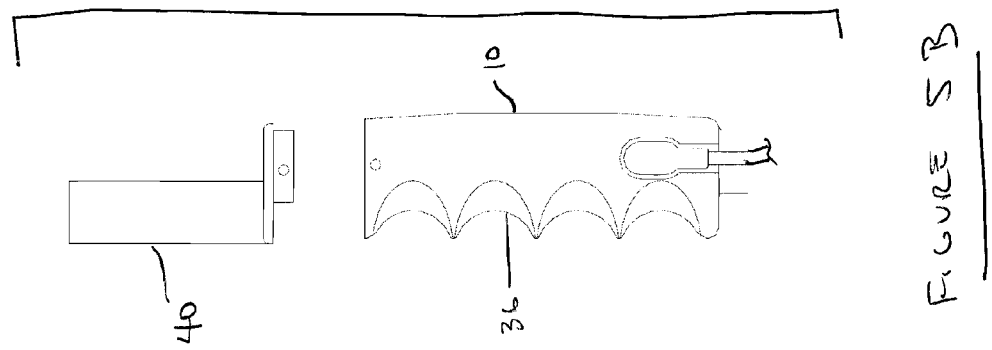
FIG. 5B is an exploded side view of a portion of the handle of the camera manipulation device of the present invention without a control activator module attached.
Figure 5A:
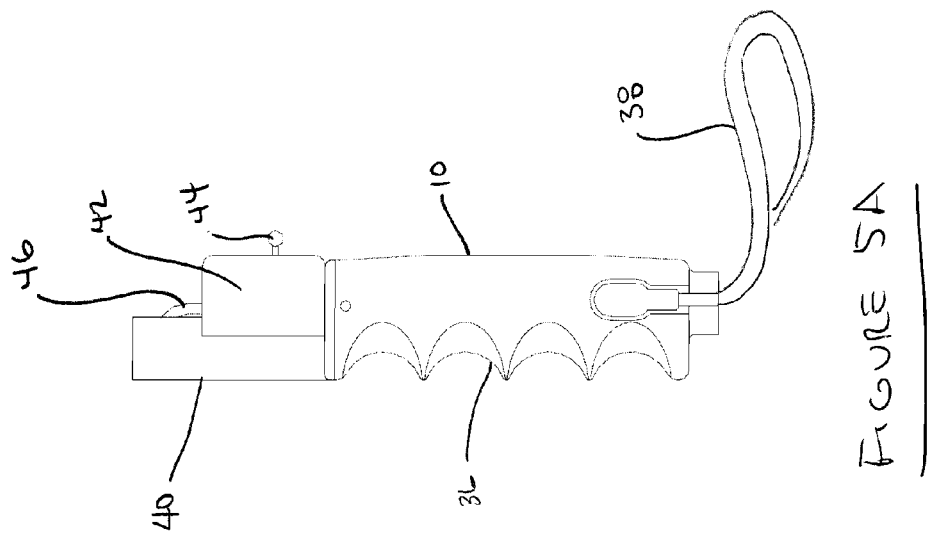
FIG. 5A is a side view of a portion of the handle of the camera manipulation device of the present invention with a control activator module attached.

The handle 10 may also have an extension 40 integral with or affixed to the top of the grip portion 36, as shown in FIGS. 5A and 5B. The extension 40 is intended to be used to retain a control module 42, having one or more control activators 44 for controlling one or more functions of the camera 1. To facilitate such control, the control activators 44 are operatively connected to the camera 1, preferably through a control line 46 that runs from the control module 42, through the handle 10 and to the camera 1. Such a control line 46 preferably terminates in a standard jack 48 that connects to a universal receptacle on most cameras that provide remote control of one or more camera functions.

In the most preferred construction shown in FIG. 1, the extension 40 includes an elongated opening 50 for retaining the control module 42, wherein the height of the control module 42 can be moved up or down relative to the grip portion 36 of the handle 10. The ability to adjust the positioning of the control module 42, and thus the control activators 44, relative to the grip 36 portion of the handle 10 permits comfortable control by users with different sized hands.

The main components of the device 2, including the plate 4, the legs 26, the connector elements 12 and at least a portion of the handle 10 can be formed of any suitable material, including metals, such as stainless steel or aluminum, or wood, plastics, etc. Notwithstanding, the material of the components is not intended to limit the invention due to the number of available possibilities.

Figure 2A:
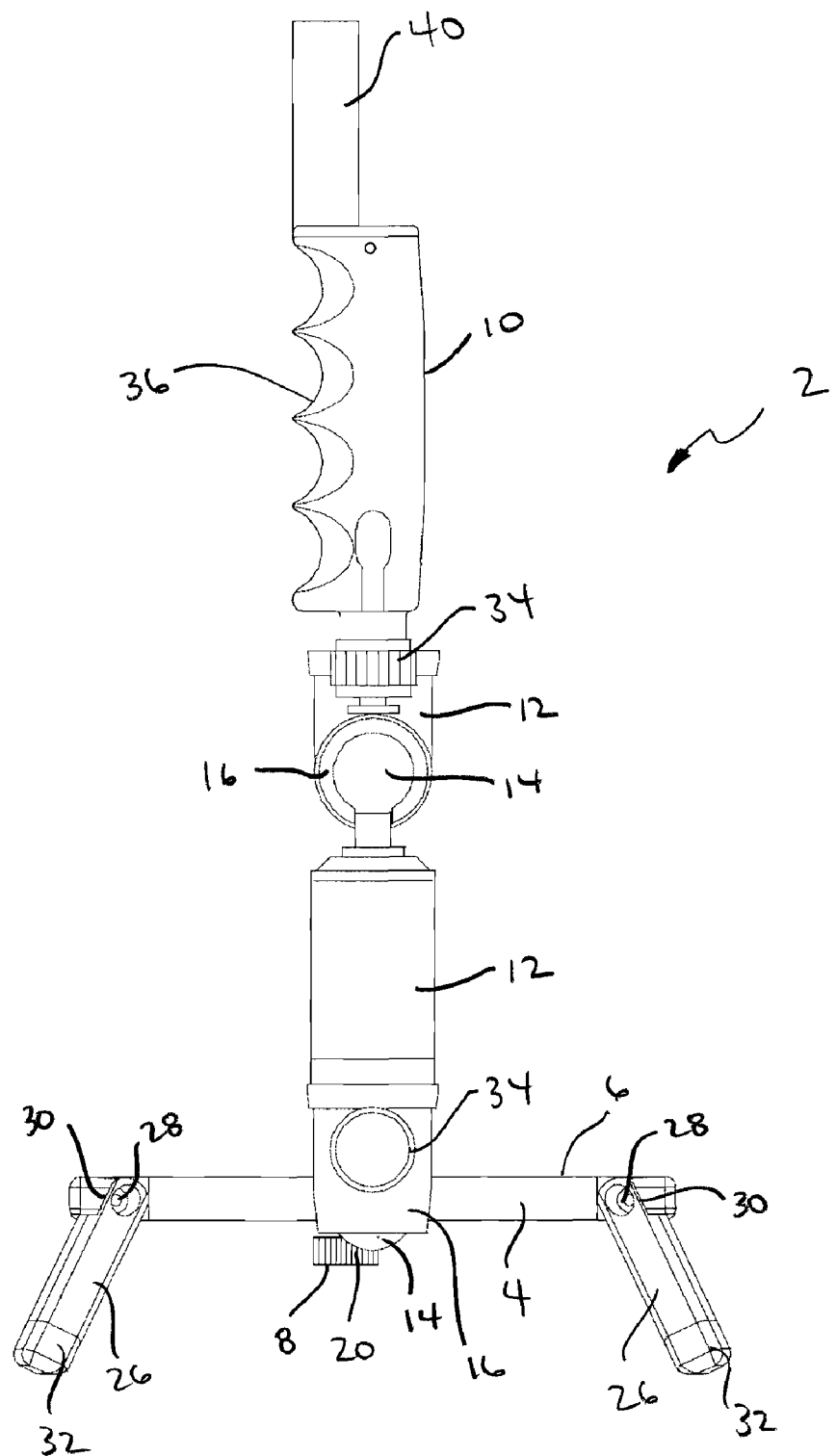
FIG. 2A is a side elevation of the camera manipulation device of the present invention with the legs extended.
Figure 2B:
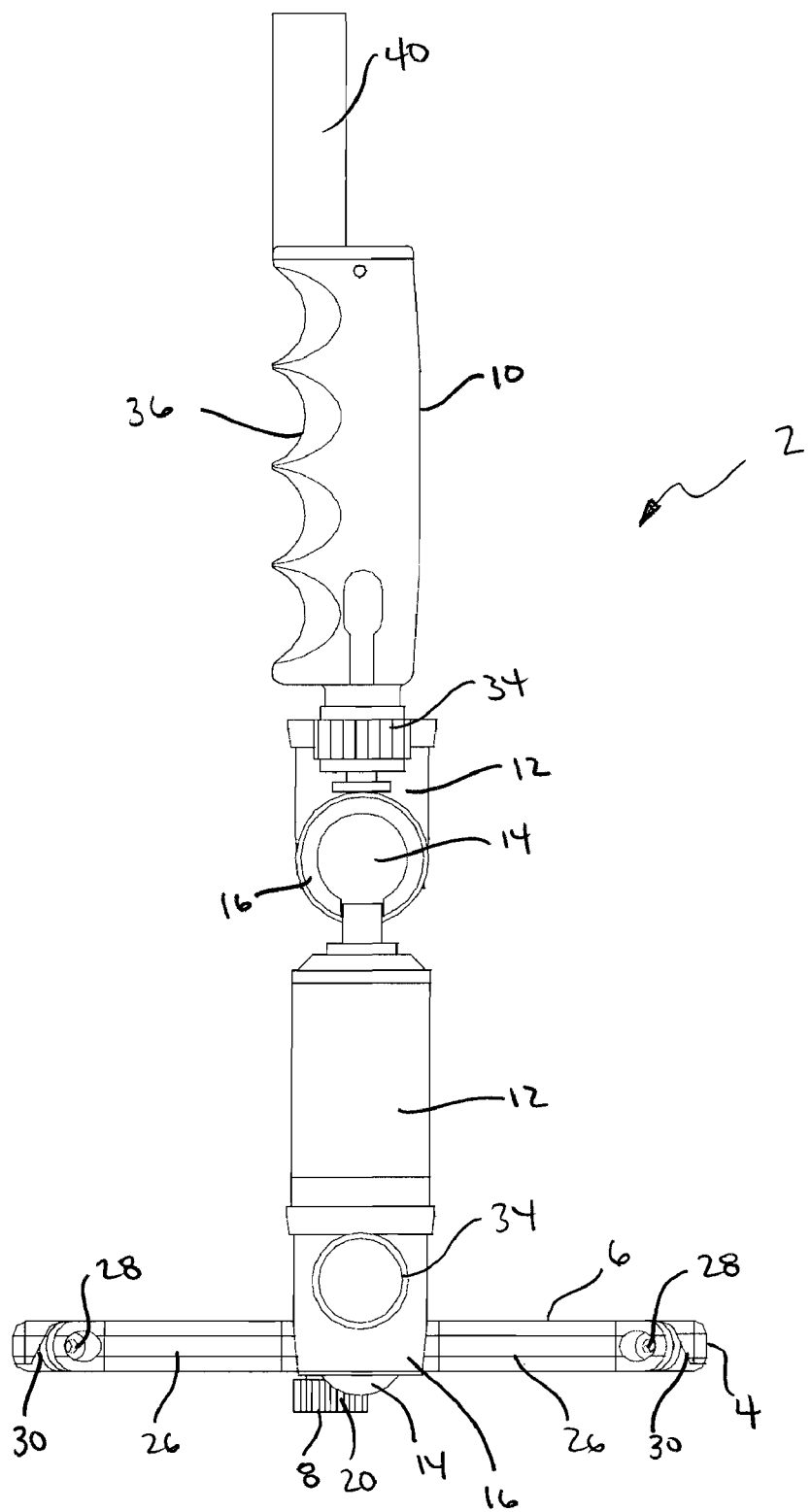
FIG. 2B is a side elevation of the camera manipulation device of the present invention with the legs retracted.
Figure 2C:
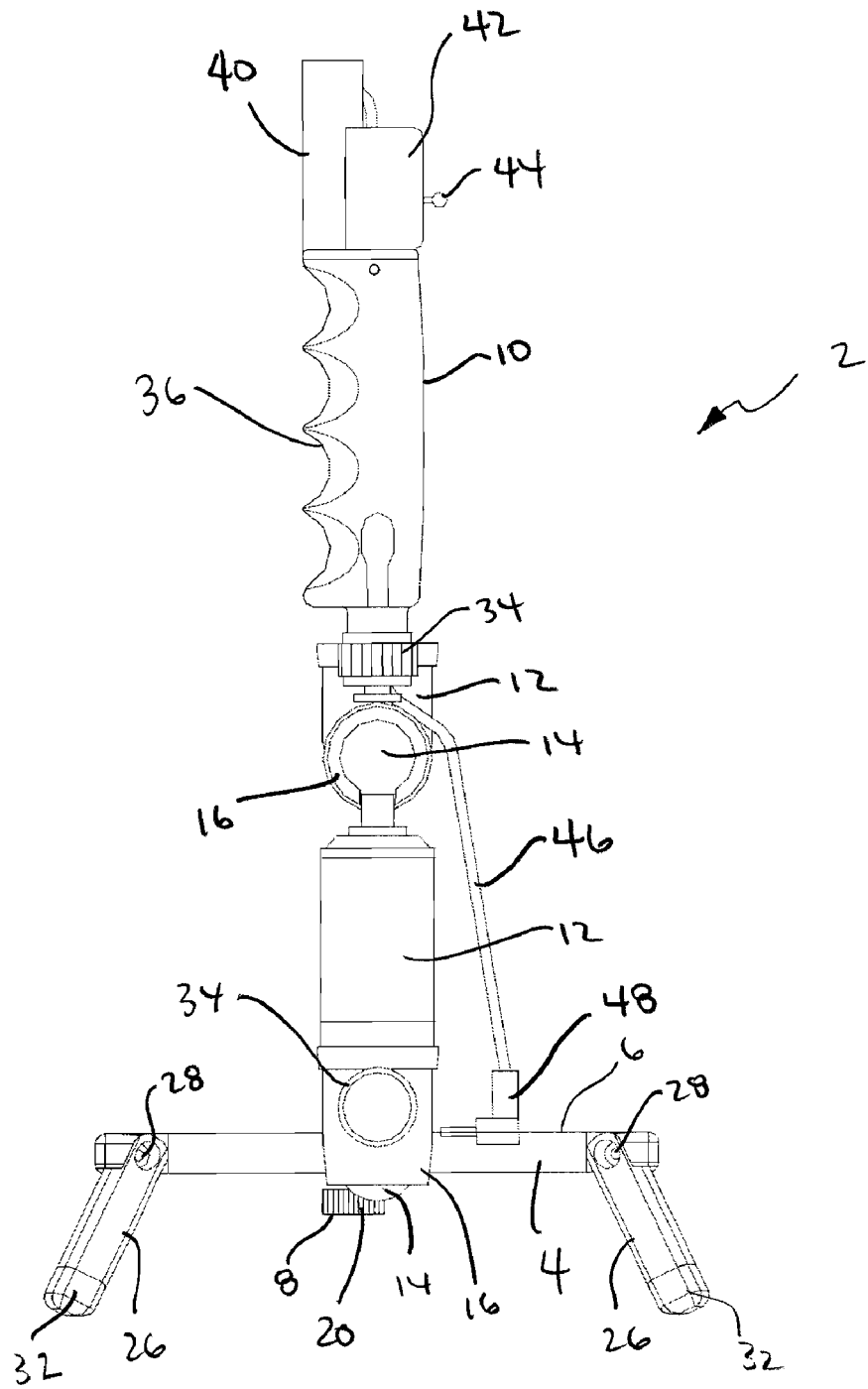
FIG. 2C is a side elevation of the camera manipulation device of the present invention with a control module and control line.
Figure 3:
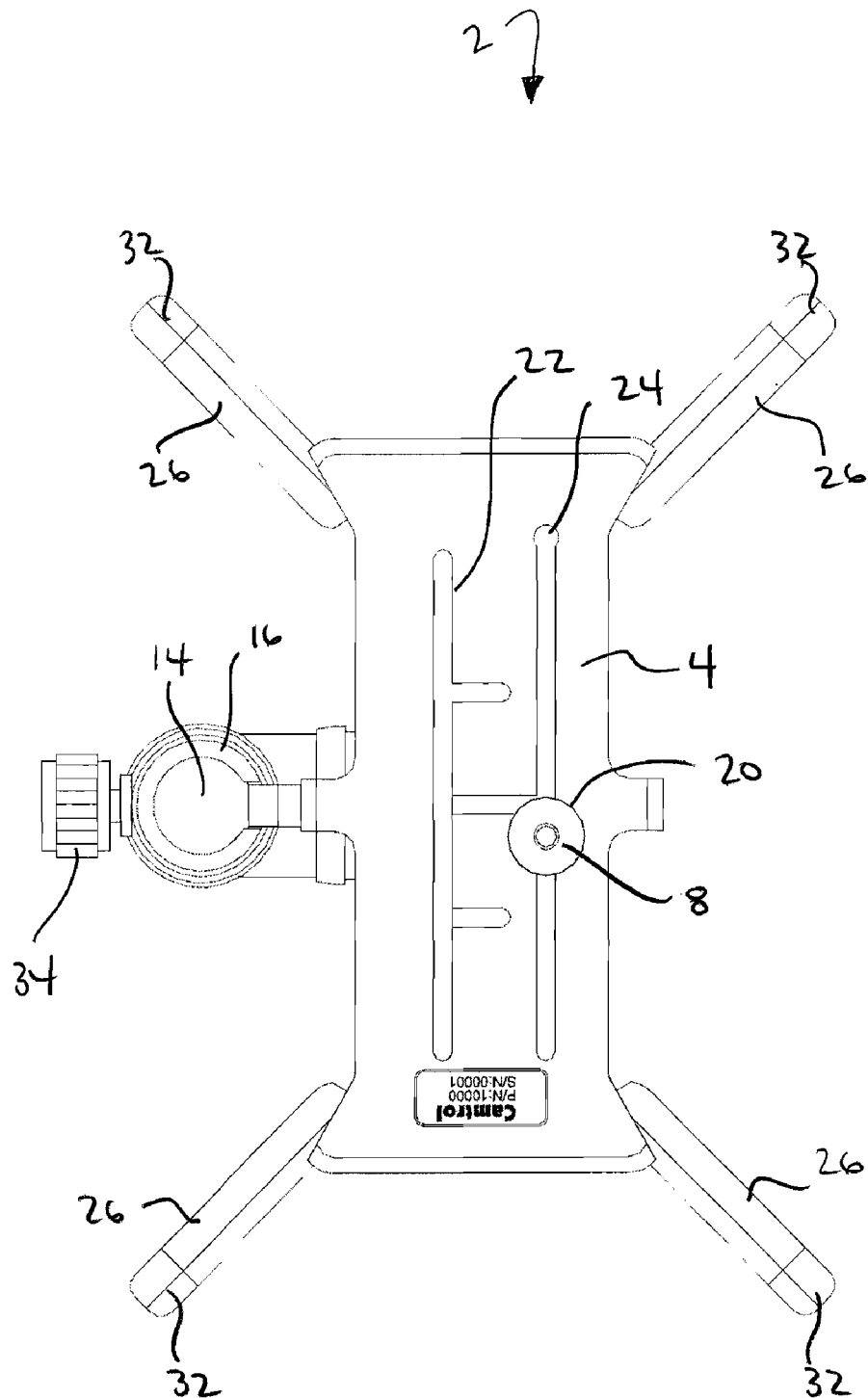
FIG. 3 is a bottom view of the camera manipulation device of the present invention with the legs extended.

Use of the device 2 of the present invention permits the user to hold the camera 1 while taking images in a wide variety of angles and perspectives by reconfiguring the device 2 through the repositioning of the components about the pivot assemblies. For example, the user can hold the camera 1 down at ground level, at waist level, at eye level, etc. with the device 2 configured as shown in FIG. 2B. When the device is configured with the handle 10 below the plate 4 (not shown) the user can hold the camera 1 above his/her head so as to create an elevated vantage point. In the preferred embodiment, the pivot assemblies can be rotated as well as angled so that the user can take images at right angles or around corners. Moreover, the pivot assemblies permit the handle 10 to be adapted to use on either the right side or the left side of the camera 2 for ambidextrous use. In addition, the device 2 creates an exoskeleton that provides protection to the camera.

It is also contemplated that the device 2 be used as a platform when the legs 26 are in the extended configuration and the feet 32 engage a stable surface such as a desktop or shelf. When so configured, the device can hold the camera 1 for taking stable images, for storage of the camera 1 or for editing content on the camera 1, with the camera 1 attached to a computer, etc., including downloading or manipulating the images on the camera 1.

Variations, modifications and alterations to the preferred embodiment of the present invention described above will make themselves apparent to those skilled in the art. All such variations, modifications, alterations and the like are intended to fall within the spirit and scope of the present invention, limited solely by the appended claims.

We claim:

1. A camera manipulation device comprising:
   a. a plate having a top surface and a plurality of rest elements taken from the group consisting of legs and feet extending from the plate
   b. a mounting element for securing a camera to the top surface of the plate;
   c. a handle for a user to hold the camera manipulation device, said handle comprising a grip portion having tactile elements;
   d. two or more connector elements for connecting the handle to the plate, wherein each of said connector elements comprises at least one of a first and second pivot element;
   e. three or more pivot members in a line between the plate and the handle, each pivot member comprising cooperating first and a second pivot elements, including a first pivot member between the slate and a connector element, a second pivot member between adjacent connector elements and a third pivot member between a connector element and the handle.

2. The camera manipulation device of claim 1 wherein the rest elements comprise a plurality of legs extending from the plate.

3. The camera manipulation device of claim 2 further comprising a pivot between the plate and the legs for retracting the legs.

4. The camera manipulation device of claim 2 further comprising feet located at a terminal end of each of a plurality of legs extending from the plate.

5. The camera manipulation device of claim 4 further comprising a pivot between the plate and the legs for retracting the legs.

6. The camera manipulation device of claim 5 wherein the plurality of legs comprises four legs.

7. The camera manipulation device of claim 1 comprising two connector elements between the handle and the plate.

8. The camera manipulation device of claim 1 wherein the plate comprises at least one of a first and a second pivot element for cooperating with the at least one of the first and second pivot element on at least one connector element.

9. The camera manipulation device of claim 1 wherein the plate further comprises one or more slots for positioning the mounting element relative to the plate.

10. The camera manipulation device of claim 9 wherein the plate comprises a plurality of slots for positioning the mounting element relative to the plate.

11. The camera manipulation device of claim 1 wherein the handle comprises at least one of a first and a second pivot element for cooperating with the at least one of the first and second pivot element on at least one connector element.

12. The camera manipulation device of claim 1 further comprising one or more control activators for controlling one or more functions on a camera mounted on the plate.

13. The camera manipulation device of claim 12 wherein one or more of the control activators are disposed on a control activator module associated with the handle, said control activator module being movably attached to the handle, including a handle extension.

14. The camera manipulation device of claim 12 further comprising a control line operatively associated with the one or more control activators having a jack for attaching to the camera.

15. The camera manipulation device of claim 1 further comprising a pivot lock associated with at least one of the first and second pivot elements for releasably locking the first and second pivot elements in fixed relation to one another.

16. The camera manipulation device of claim 1 wherein the first and second pivot elements comprises cooperating ball and socket elements.

17. The camera manipulation device of claim 12 further comprising a pivot lock associated with the socket, including a screw down member which compresses the socket about the ball to releasably lock the ball and socket in fixed relation to one another.

18. The camera manipulation device of claim 1 wherein the rest elements comprise feet extending from the plate for contacting a surface on which the device can rest.

19. The camera manipulation device of claim 1 wherein the handle further comprises a strap for assisting the user's engagement of the device.

20. The camera manipulation device of claim 1 wherein the plurality of rest elements extending from the plate comprises four rest elements.

* * * * *

UNITED STATES PATENT AND TRADEMARK OFFICE
CERTIFICATE OF CORRECTION

| | | |
|---|---|---|
| PATENT NO. | : 7,980,770 B2 | Page 1 of 1 |
| APPLICATION NO. | : 12/565364 | |
| DATED | : July 19, 2011 | |
| INVENTOR(S) | : Jonathan Rowen et al. | |

It is certified that error appears in the above-identified patent and that said Letters Patent is hereby corrected as shown below:

Claim 1, subparagraph (e) at line 48 of Col. 6 has a typo in the spelling of the word "plate" as "slate".

Signed and Sealed this
Eighteenth Day of October, 2011

David J. Kappos
*Director of the United States Patent and Trademark Office*